Nov. 2, 1965  H. M. PIKER  3,214,830
METHOD OF MAKING AN INSULATED CONTAINER
Original Filed Dec. 13, 1960  3 Sheets-Sheet 1
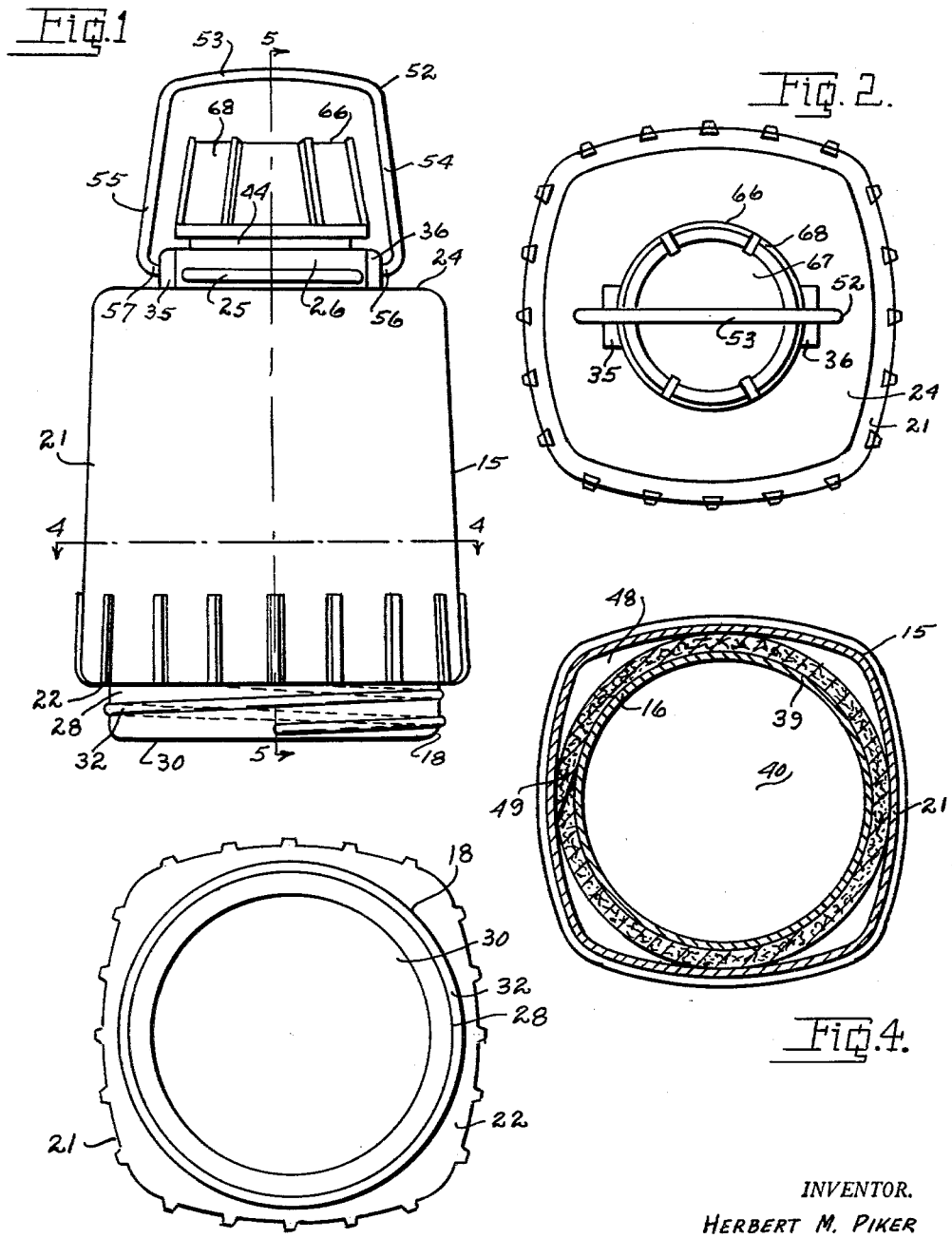
INVENTOR.
HERBERT M. PIKER
BY
Joseph A. Rare
Attorney

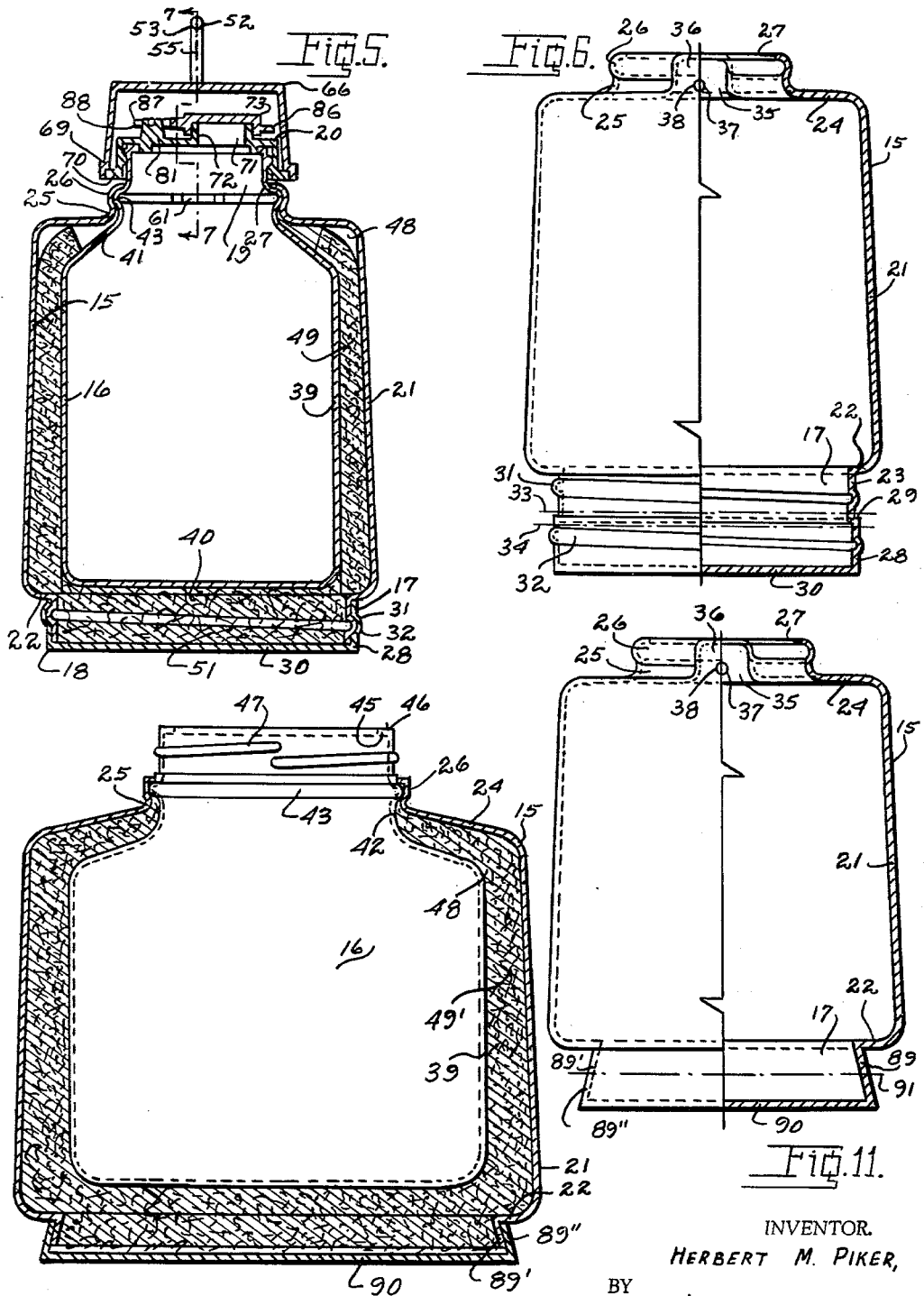

Nov. 2, 1965  H. M. PIKER  3,214,830
METHOD OF MAKING AN INSULATED CONTAINER
Original Filed Dec. 13, 1960  3 Sheets-Sheet 3
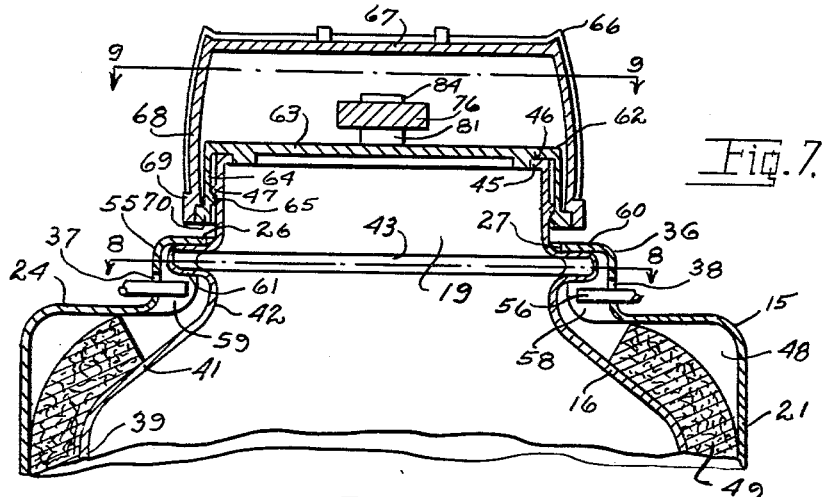
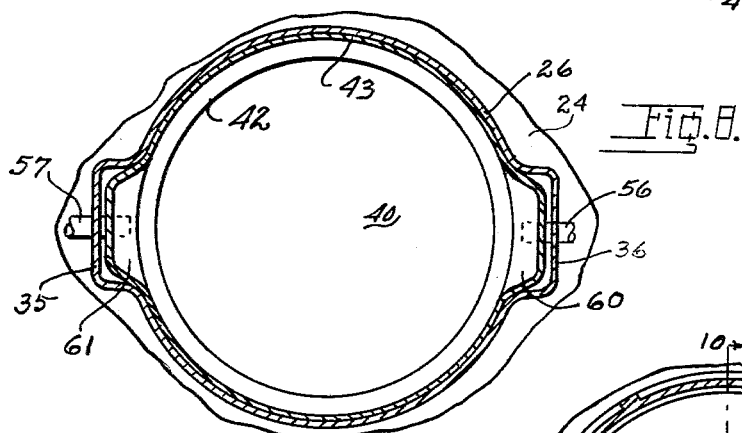
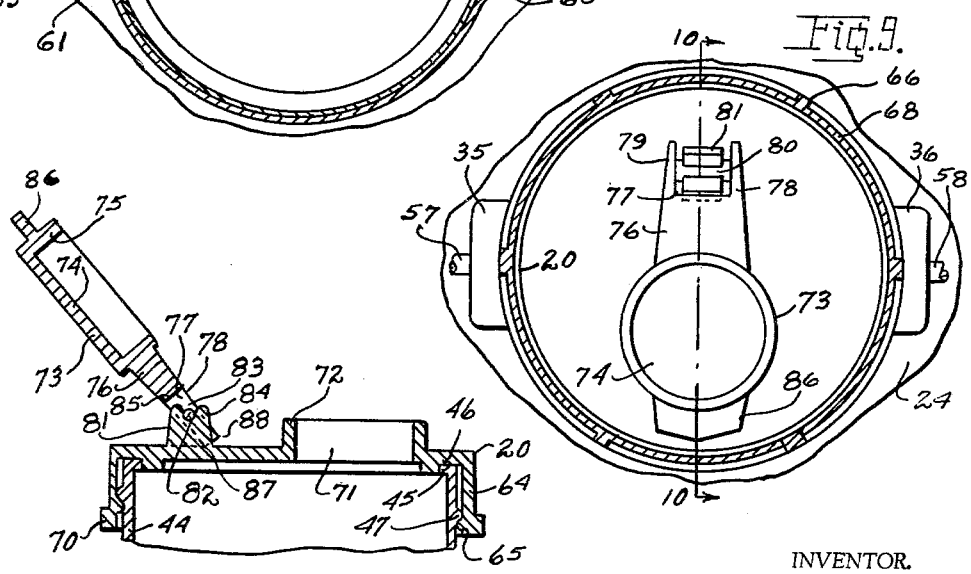
INVENTOR.
HERBERT M. PIKER
BY
Joseph A. Rave
Attorney United States Patent Office 3,214,830
Patented Nov. 2, 1965

3,214,830
METHOD OF MAKING AN INSULATED
CONTAINER
Herbert M. Piker, Wyoming, Ohio, assignor to The Hamilton-Skotch Corporation, Hamilton, Ohio, a corporation of Ohio
Original application Dec. 13, 1960, Ser. No. 75,617. Divided and this application May 16, 1962, Ser. No. 195,342
2 Claims. (Cl. 29—416)

This application is a division of the application of Herbert M. Piker, Serial No. 75,617, filed December 13, 1960 and entitled, Insulated Container.

This invention relates to improvements in a method of making an insulated container, particularly the outer member of such a container.

The invention is disclosed in connection with a container frequently referred to as a "jug" such as would be employed in transporting liquids in either a hot or cold state and with said liquids retained in this hot or cold state for a considerable period of time.

Broadly, containers for the purpose of that herein shown and described are well known, but those heretofore known included materials requiring machining particularly when parts thereof were formed of metal. The container of the present invention is formed entirely of molded synthetic resins and which molded parts are merely assembled by properly positioning of the parts with respect to one another.

The principal object of the present invention, therefore, is the provision of a method of making a molded inner and outer member which are readily assemblable with one another to have the inner member suspended within the outer member.

Another object of the present invention is the provision of a method of making a container that will meet the foregoing object and in which the parts, inner and outer container, are formed by the "blow" molding process.

A further object of the present invention is the provision of a method of making an insulated container in which the inner and outer member while formed by the "blow" molding process are so designed that the said outer member may be provided with an open end through which the inner member is inserted without loss of material in the said outer member when adapting it to receive the inner member.

A still further object of the present invention is the provision of a method of making a molded container whereby the outer member of the insulated container is formed or made and whereby said outer container is subsequently formed to provide an opening therethrough to the interior thereof and the means through which said opening is provided forming the eventual or subsequent closure for the outer member opening.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a side elevational view of the insulated container of the present invention.

FIG. 2 is a top plan view of the container of FIG. 1.

FIG. 3 is a bottom view of the container of FIG. 1.

FIG. 4 is a transverse sectional view through the container as seen from line 4—4 on FIG. 1.

FIG. 5 is a vertical sectional view through the container as seen from line 5—5 on FIG. 1.

FIG. 6 is a view partly in section and partly in elevation of the outer member of the container which includes a closure member for said container and which view illustrates the method of producing said outer member and its closure.

FIG. 7 is an enlarged, vertical, sectional view of the upper end of the insulated container of the present invention, as seen, for example, from line 7—7 on FIG. 5.

FIG. 8 is a fragmentary, transverse, sectional view through the upper end of the container as seen from line 8—8 on FIG. 7.

FIG. 9 is a view showing the upper end, container closure, in plan and its removable cup in section as seen from line 9—9 on FIG. 7.

FIG. 10 is a fragmentary, sectional view of the upper end or closure cap of the insulated container showing the parts in a second position of use, as seen, in effect, from line 10—10 on FIG. 9.

FIG. 11 is a view similar to FIG. 6 showing a modification in the invention.

FIG. 12 is a view partly in section and partly in elevation embodying the modification of FIG. 11.

Throughout the several views of the drawings similar reference characters are employed to denote the same or similar parts.

As was noted above, this invention pertains to improvements in an insulated container such as are generally referred to as "picnic jugs." Picnic jugs are not new, per se, but as herein disclosed a new and economical jug is produced and in which the parts are molded from synthetic resins and simply snapped or assembled with one another and which action automatically secures the parts to one another for permanently suspending an inner member within an outer member.

Specifically, and referring to the drawings, specifically, FIG. 5, there is provided an outer member 15, an inner member 16, assembled with the outer member through an opening 17 at the lower end of said outer member and with said outer member opening 17 closed by a cap 18. The inner member 16 is provided at its upper end with an opening or outlet 19 normally closed by a readily removable cap 20.

The outer member 15 includes a body portion 21 which as shown in FIGS. 2, 3 and 4, for example, is of angular cross section, that is, has four sides which though rounded or slightly arcuate are, substantially, at right angles to one another thereby giving said outer container body 21 the general appearance of being square in transverse cross section or plan. The lower ends of the said body portion 21 inwardly turn to provide a bottom 22 from which downwardly projects a sleeve 23 having formed centrally thereof the opening 17 to the interior of the outer member 15. The upper ends of the body portion sides likewise inwardly project to form a top 24 substantially centrally of which rises a neck 25 terminating an outwardly formed bead or hollow flange 26 with an opening 27 centrally of the bead 26.

The said outer member body 21 when being formed is formed by the "blow" method and at this time is provided beyond its sleeve 23 with a second sleeve 28, see FIG. 6, of an internal diameter closely approaching the external diameter of the sleeve 23. The said sleeve 28 and the sleeve 23 are joined to one another by a shoulder or flange 29 radially outwardly projecting from the outer end of the sleeve 23. The sleeve 28 has its outer end closed by a disclike closure or body member 30.

The sleeves 23 and 28 are respectively provided with an outwardly projecting rib 31 and 32 which are actually screw threads adapted to be interengaged by one another as will subsequently be made clear, and as clearly illustrated in FIG. 5.

The projecting second sleeve 28 and its disc closure member 30 form the above referred to closure member or cap 18 that closes the opening 17 to the interior of the outer member 15.

The said closure member 18 is obtained by the improved method of the present invention by severing the said sleeve 28 from the sleeve 23 by removing the shoulder or radial flange 29 from the molded part. In other words after the outer member 15 and closure member or cap 18 have been formed as illustrated in FIG. 6 the parts are separated from one another between the phantom lines 33 and 34 and which lines represent, in effect, the thickness of a severing tool employed in separating or severing the parts from one another, and which cutting or severing tool is of a thickness substantially equal to the radial flange or shoulder 29. It is believed obvious from the foregoing and the above description that after the said parts have been separated from one another the closure cap 18 through its sleeve 28 may be fitted on the sleeve 23 since the internal diameter of the sleeve 18 is substantially equal to the external diameter of the sleeve 23 and since the parts are provided with complementary and interengaging threads 31 and 32 the closure 18 may be screwed or threaded onto the sleeve 23.

The upper end of the outer member 15 is provided at two diametrically opposite points with outwardly projecting hollow lugs 35 and 36 through the outer vertical wall of which there is provided an aperture, respectively, 37 and 38, for a purpose subsequently to be described.

The inner member or container, per se, includes a body portion 39 which is preferably circular in cross section or plan and of a diameter to pass freely through the opening 17 at the bottom of the outer member. The lower end of the container wall 39 forms a bottom 40 for the said container while the upper ends thereof conically inwardly extends as at 41 terminating in a neck 42. The neck 42 upwardly of the conical portion 41 is formed with an outwardly projecting flange or bead 43 which is followed by a slightly reduced cylindrical neck portion 44. The upper end of the reduced neck portion 44 inwardly turns as a radial flange 45 to provide a flat face 46 at the upper end of the neck portion 44 and which cooperates with a closure cap to form a seal for the upper end of the inner container. The said reduced neck portion 44 is provided externally thereof with a rib 47 constituting or forming a screw thread.

The external diameter of the container flange or bead 43 is such as to be substantially equal to the internal diameter of the outer member flange or bead 26 and said container bead or flange 43 has its outer diameter slightly greater than the internal diameter of the outer member neck 25 adjacent to but below its flange or bead 26. The outer diameter of the container neck rib or thread 47 is such as to just pass through the opening 27 at the upper end of the outer member 15 flange or bead 26.

After the outer member 15 has been formed or blown as illustrated in FIG. 6, and the said outer member has had severed therefrom the closure member or cap 18, and after the inner container 16 has been formed or blown the said inner member is inserted through the outer member bottom opening 17 and pressure applied to the parts to cause the inner member bead 43 to be snapped through the outer member neck 25 into the seat provided on the interior of the outer member flange or bead 26. It is to be understood that during this assemblage of the inner and outer members the reduced diameter neck portion 44 of the inner member or container 16 is passing through the top opening 27 of the outer member flange or bead 26. After the said beads 43 and 26 have been interengaged the parts are completely and operatively associated with one another to the point of substantially defying separation, except by or through extreme pressure on the parts and only by having said pressure carefully applied to the parts.

From the foregoing, it will now be apparent that there has been provided a container including an outer member 15 and an inner member or container 16 with a considerable space 48 between the body portions 21 and 39, respectively, thereof. In order to fully insulate the said parts from one another the said space 48 is filled with heat insulating material such as spun glass. It should be noted that this insulating material may have granular form for filling the said space 48, preferably, however, the said insulating material will take the form of a sheet or blanket which is wrapped around the body 39 of the container 16 prior to the assembly of the parts and since the said blanket is compressible it could be compressed for insertion within the outer member at the same time that the container 16 is being inserted into the outer member, but, the insulating blanket is preferably laid within the outer member 15 against the inner surface of its body 21 and the inner container passed through the said insulating blanket to its final and suspended position. The said insulating blanket or material is identified in the drawings by the reference numeral 49.

As will be seen from FIG. 5 the bottom 40 of the inner member or container 16 is upwardly spaced from the closure cap body portion 30 thereby providing between the said bottoms a space 50 and which is occupied by a disc 51 of insulating material placed within the opening 17 of the sleeve 23 prior to the screwing onto said sleeve of the closure cap 18.

In order to transport the insulated container there is provided a bail handle, indicated in its entirety by the reference numeral 52, comprising a grip or body portion 53 from the opposite ends of which depend arms 54 and 55 with said arms having their lower free ends inwardly turned as fingers, respectively, 56 and 57. As will be noted particularly in FIG. 7 the lugs 35 and 36 extend for the entire height of the outer member neck 25 and including the outer member flange or bead 26 while the flange or bead 43 of the inner member neck occupies merely the space of the flange 26 and thereby provides space beneath the said inner container flange or bead 43 within said projections 35 and 36. It is into this space 58 and 59, respectively of the lugs 35 and 36, that the bail handle fingers 56 and 57 project and are thereby disposed beneath the inner container flange or bead 43. As seen in FIG. 8 the said inner member or container flange or bead 43 is provided at two diametrically opposite points with outwardly projecting ears 60 and 61 with said ears, see FIG. 7, respectively, projecting into the hollow interiors of the lugs 35 and 36 and with said lugs upon final assembly of the parts overlying the bail handle fingers 56 and 57 for thereby additionally locking the parts in their operative or assembled position and at the same time disposing a part of the weight of the inner container, when filled, on the said carrying handle instead of throwing all of said weight on the interengaged or interlocked flanges or beads 43 and 26.

In practice the opening through the inner member or container neck 44 is employed to fill the said inner member or container 16 and this opening is closed by a cup shaped cap 62 which comprises the usual closing body member 63 and depending skirt 64 having an inwardly projecting thread 65 cooperating with the neck thread 45 in securing the cap 62 in operative position and with the inner surface of the closure cap body 63 engaging the flat surface 46 at the upper end of the neck 44.

A suitable and usual closure cap 66 is provided which is quite similar in cross section to the closure cap 62 having a body portion 67 and a peripheral flange 68 extending from the body portion 67. The closure cup is frictionally held in position through a groove 69 at the free end of the flange wall 68 engaging with an outwardly projecting flange 70 on the closure cap 62, as clearly illustrated in FIGS. 5 and 7.

As was noted above the inner member or container 16 is filled through the opening in the neck 44 and the discharge from the container could be effected in the same manner, but since the said discharge from the container is generally by way of small quantities, cupfuls, such as the closure cup 66, the said relatively large opening through the neck is inconvenient. Accordingly, the closure cap 62 is provided with a supplemental opening 71, preferably to one side of said closure cap 62 and neck passageway and with said opening 71 quite small by comparison with the opening of the neck 44. The said closure cap opening 71 is centrally of an upstanding sleeve 72 which, for convenience, may be termed a discharge nozzle.

The said sleeve or nozzle 72 is in turn closed by a closure member 73 again of the accepted construction of an inverted cup. The closure member 73, therefore, includes a body portion 74 from the rim of which depends peripheral flange 75 having an internal diameter to frictionally engage the external surface of the sleeve or nozzle 72. The closure 73 is adapted to be substantially permanently and pivotally attached to the closure cap 62 wherefore it has rearwardly projecting therefrom an arm 76. The arm 76, see FIG. 9, has its rear end furcated, as at 77, to provide mounting fingers 78 and 79. The fingers 78 and 79 are joined and have extending between them a circular member or trunnion 80.

It is through the trunnion 80 that the closure 73 is mounted in position by cooperation with an upstanding mounting lug 81, see FIGS. 7 and 10. The upstanding lug 81 is provided downwardly of its upper end with a seat 82, arcuate in elevation and communicating with the atmosphere through an opening 83 formed between lugs 84 and 85 upstanding from the arcuate seat 82.

The arcuate seat 82 is generated about a center and has a radius substantially equal to the radius of the journal 80 and wherefore the said journal 80 rolls or oscillates on the seat 82 as will presently be made clear. The journal 80 is held to the arcuate seat 82 by the lugs 84 and 85 which, as seen in FIGS. 7 and 10, somewhat overlie the said seat 82, wherefore, the opening 83 is of a transverse dimension less than the diameter of the trunnion 80. The lugs 84 and 85 are slightly springable and adapted to be sprung by the trunnion upon pressure being applied to said trunnion to cause same to pass through the opening 83 to engage the arcuate seat 82.

From the foregoing, it will be obvious that the closure 73 may be raised from its closing position by actuating the same and through its arm 76 on the axis of the trunnion 80; the closed position of the parts being illustrated in FIG. 7, while the open position thereof is illustrated in FIG. 10. In order to conveniently actuate the closure 73 it has projecting from its forward end an actuating finger 86.

As will be obvious the tilting of the container to a position for draining or pouring the last of the liquid from the inner container would cause the closure 73 to drop by gravity to a closed position and thereby interfere with the emptying of the container. In order to prevent this condition the trunnion 80 is located inwardly of the outer ends of the mounting fingers 78 and 79 a distance that the ends of said mounting fingers 78 and 79 are a greater distance from the center of generation of the arcuate seat 82 than the said center of the arcuate seat is above the upper surface of the closure cap 62. By this construction the corners 87 and 88 of the mounting fingers 78 and 79 lock the closure 73 in positions to keep it from falling by gravity to either of its operative positions, that is, the closed position of FIG. 7 or the open position of FIG. 10. This construction will find its most usefulness with respect to maintaining the said closure 73 in its open position, as clearly illustrated in FIG. 10.

Since the parts, as noted above, are formed of synthetic resin materials, plastics, there is a certain amount of inherent spring in the parts and wherefore the closure 73 through its lifting finger 86 may be forcefully positioned as illustrated in FIG. 10 and will remain in this position until forcefully actuated to the closed position of FIG. 7.

The modified construction illustrated in FIG. 11 pertains primarily to the construction of the closing means for the outer member, particularly when said outer member is formed by the "blow" process.

The said outer member bottom 22, as illustrated in FIG. 11, has a sleeve 89 downwardly projecting therefrom with its wall outwardly inclined with respect to the said container bottom 22. This sleeve 89 has its outer end closed by a disc-like closure member or body portion 90.

In practice, and after the formation of said outer member, the sleeve 89 is severed or cut on the line 91 thereby dividing the sleeve into a first portion 89′ integral with the outer member body 22 and a second portion 89″ including the closure body portion 90, and together forming the closure cap 18′ of FIG. 12. The cut on the line 91 in the modification in FIG. 11 is effected by a knife or slitting blade rather than by a cutter or kerfing tool of a thickness that would remove the flange 29 of FIG. 6.

It will be noted, that, by cutting the sleeve 89 with a single slitting or shearing blade on the line 91 the resulting sleeve second portion 89″ has at its upper end an internal diameter substantially equal to the external diameter of the sleeve portion 89′ at its upper end adjacent the outer member bottom 22 so that when said sleeves are assembled by telescoping, as illustrated in FIG. 12, the outer sleeve 89″ is locked on the sleeve portion 89′ against inadvertent displacement. This relationship of the parts is the result of the angularity of the sleeve wall to the container bottom and due to the thickness of the material, all as will be obvious from a study of said FIGS. 11 and 12.

To all intents and purposes the insulated container of FIG. 12 is otherwise identical with the container above described and fully illustrated in FIG. 5, that is, closed at its upper end by closure cap 62 and dispensing cup 66 and provided with bail handle 52.

The space 48 between the inner container and outer member, as illustrated in FIG. 12, may be supplied with insulation as above set forth. However and to further insure the locking of the sleeve portions 89′ and 89″ to one another, and thereby the closure cap 18′, after assembly, use may be made of a foam type of plastic insulation.

This foam type of plastic insulation is well known and consists, essentially, of mixing two liquids such as, toluene and di-isocyanate. In other words, after the inner container and outer member have been interconnected by engaging the flange or bead 43 of the inner container neck with the outer member bead or channel 26 and before the closure cap 18′ is applied to the outer member, proper quantities of the liquids, such as, toluene and di-isocyanate, are placed within the said space 48 between the inner container and outer member and thereafter the said closure cap 18′ placed in position.

The chemical reaction of the insulation, or foam, forming liquids commences substantially immediately upon their association and continues until the said chemical reaction has affected all of the liquid and which means that the entire space is taken up by the said foam. The foam hardens to a substance generally referred to as foam plastic having a definite shape and rigidity. This action therefore results in the space within the outer member bottom sleeve portion 89′ and below the bottom of the inner container and the upper surface of the body member 90 of the closure cap 18′ having a tapered circular wedge shape for locking the parts to one another and preventing the removal of the sleeve portion 89″ (closure cap 18′) from the outer container.

What is claimed is:

1. The method of producing a plastic outer or enclosing container or member by the blow method for an insulated container comprising forming by blow molding in a suitable mold the said outer or enclosing container or member to include a top, a bottom having a downwardly extending sleeve axially centrally of the bottom with said sleeve including a first portion and a second portion closed at the outer end of the second portion by a body portion and said sleeve being outwardly tapered from the outer or enclosing member bottom to form in effect a truncated cone below said bottom, connecting sides between the top and bottom, a neck upwardly of the top centrally apertured, removing said formed container from the mold, severing said sleeve intermediate the first and second portions thereof for separating said sleeve second portion from the sleeve first portion and to provide an opening through said sleeve first portion to the interior of the outer or enclosing container or member and each sleeve portion being in the form of a shallow truncated cone whereby said sleeve portions have complementary tapers interengagable with one another upon the telescoping thereof for locking the sleeve second portion on the sleeve first portion, and subsequently snap-fitting said second sleeve portion onto said first sleeve portion and with said sleeve second portion body portion closing the opening through the sleeve first portion.

2. The method of producing an insulated plastic container comprising forming an outer or enclosing member by blow molding to including a top, a bottom, connecting sides, a centrally apertured neck upwardly of the top and suspending means integral with said neck for subsequent use, forming an inner container to have a top, a bottom, connecting sides between the top and bottom, a neck upwardly of the top and suspending means integral with the inner container neck for subsequent use, said inner container being formed to dimensions less than the dimensions of the outer or enclosing member, removing a portion of the bottom of the outer or enclosing member to form an opening therethrough to a dimension to permit passage of the inner container, inserting said inner container through the outer or enclosing member bottom opening to be within the outer or enclosing member and to have the inner container neck project through and upwardly of the outer or enclosing member neck aperture, interengaging the suspending means of the outer or enclosing member neck and the co-operating means of the inner container neck for suspending the said inner container within the outer or enclosing member, said removed portion of said bottom being adapted to be subsequently used as a closure member for said bottom opening, and fitting and securing said bottom removed portion to said remaining portion of the bottom as a closure member for the bottom opening.

References Cited by the Examiner

UNITED STATES PATENTS

| | | | |
|---|---|---|---|
| 1,589,138 | 6/26 | Fisk | 215—11.3 |
| 1,676,004 | 7/28 | Bultman | 215—13 |
| 1,987,892 | 1/35 | Duevel et al. | 215—13 |
| 2,790,475 | 4/57 | Close | 150—.5 |
| 2,837,232 | 6/58 | Rossi | 215—13 |
| 2,838,194 | 6/58 | Piker | 215—13 |
| 2,880,899 | 4/59 | Bramming | 215—13 |
| 2,966,872 | 1/61 | Schmocker | 113—51 X |
| 2,981,430 | 4/61 | Tsien et al. | 215—13 |
| 3,004,285 | 10/61 | Hagen. | |
| 3,096,897 | 7/63 | Hansen | 215—13 |

WHITMORE A. WILTZ, *Primary Examiner.*